United States Patent [19]

Addeo et al.

[11] Patent Number: 5,262,117
[45] Date of Patent: Nov. 16, 1993

[54] PROCESS FOR PREPARING THERMOINSULATING AND/OR STRUCTURAL FORMED ARTICLES AND PRODUCTS SO OBTAINED

[75] Inventors: Antonio Addeo, Naples; Lucio Pinetti, Milan; Annibale Vezzoli; Francesco Mascia, both of Como, all of Italy

[73] Assignee: Centro Sviluppo Settori Impiego S.r.l., Milan, Italy

[21] Appl. No.: 945,440

[22] Filed: Sep. 14, 1992

Related U.S. Application Data

[63] Continuation-in-part of Ser. No. 771,608, Oct. 4, 1991, abandoned.

[30] Foreign Application Priority Data

Oct. 12, 1990 [IT] Italy ................. 21719 A/90

[51] Int. Cl.⁵ ............ B29C 51/10; B29C 51/12; B29C 51/16; B29C 51/42
[52] U.S. Cl. ................. 264/510; 264/511; 264/516; 264/237; 264/265; 264/269; 264/348; 156/287
[58] Field of Search ............ 264/510, 511, 512, 516, 264/292, 322, 265, 237, 269, 348; 425/503, 504, 517, 521; 156/287

[56] References Cited

U.S. PATENT DOCUMENTS

| | | | |
|---|---|---|---|
| 3,445,892 | 5/1969 | Amberg et al. | 425/504 |
| 3,533,135 | 10/1970 | Christensson | 425/504 |
| 3,753,830 | 8/1973 | Cruckshank et al. | |
| 4,325,905 | 4/1982 | Takahashi | 425/504 |
| 4,863,667 | 9/1989 | Martelli | |
| 4,923,539 | 5/1990 | Spengler | 264/511 |

FOREIGN PATENT DOCUMENTS

| | | |
|---|---|---|
| 2917907A | 11/1979 | Fed. Rep. of Germany . |
| 3221638A | 12/1982 | Fed. Rep. of Germany . |
| 21815 A/87 | 9/1987 | Italy . |
| 58-22142 | 2/1983 | Japan ............ 264/516 |
| 58-22143 | 2/1983 | Japan ............ 264/516 |
| 58-217181 | 12/1983 | Japan ............ 264/511 |
| 202510A | 12/1979 | United Kingdom . |

OTHER PUBLICATIONS

Dylite Expandable Polystyrene Chapter 4C.

*Primary Examiner*—Catherine Timm
*At* .ve Bryan

[57] ABSTRACT

A process for preparing thermoinsulating and structural formal articles in which
(a) a thermoplastic polymer sheet is heated at a temperature above its softening point;
(b) the heated thermoplastic polymer sheet is thermoformed on a thermoinsulating foamed preform made of substantially the same polymeric material; and in which
(c) prior to the thermoforming in step (b), the thermoinsulating foamed preform is cooled to prevent excessive collapse of the surface of the thermoinsulating foamed preform resulting from contact with the heated sheet.

6 Claims, 1 Drawing Sheet

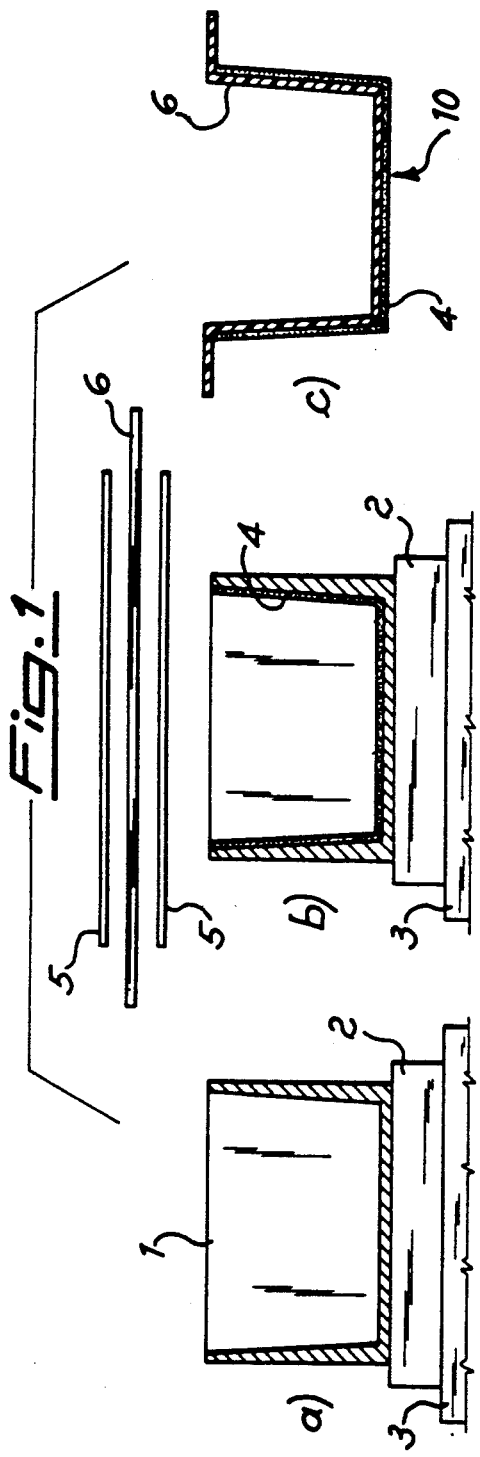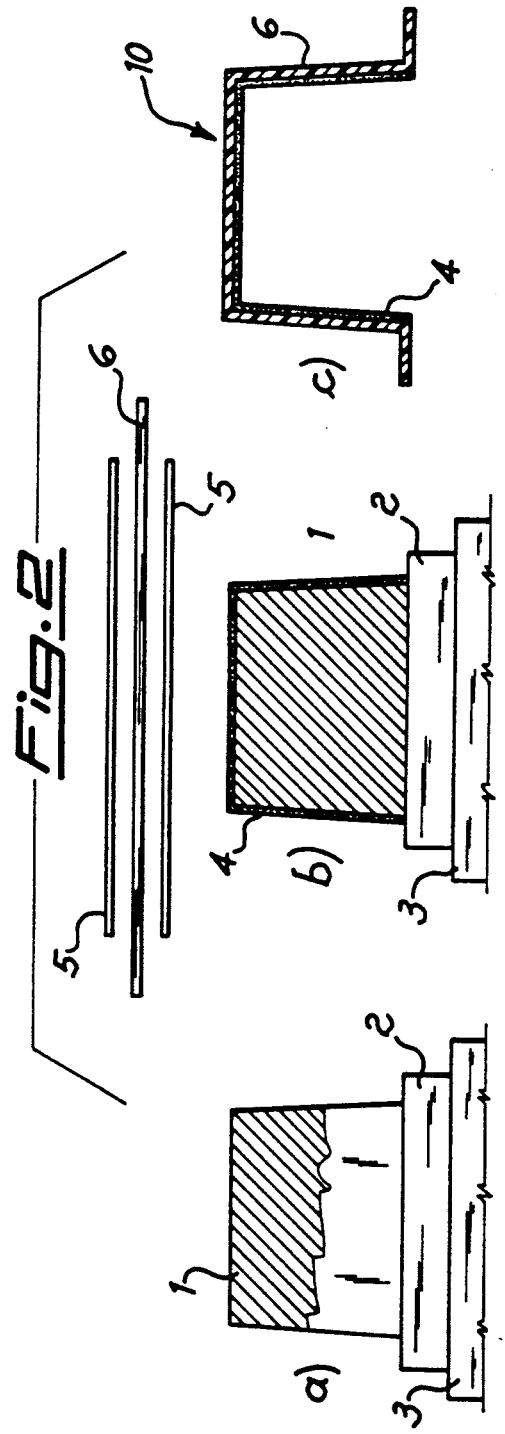

PROCESS FOR PREPARING THERMOINSULATING AND/OR STRUCTURAL FORMED ARTICLES AND PRODUCTS SO OBTAINED

This is a continuation-in-part of U.S. application Ser. No. 07/771,608, filed Oct. 4, 1991, now abandoned, which is incorporated by reference herein.

The present invention relates to a process for preparing thermoinsulating and/or structural formed articles and to the products so obtained.

More in particular, the present invention relates to a process for preparing thermoinsulating and/or structural formed articles by thermoforming on foamed preforms.

Still more in particular, the present invention relates to a process for preparing thermoinsulating and/or structural formed articles, which does not necessarily involve the use of a foamed insulating material obtained by means of agents of chlorofluoroalkane nature.

The term "formed article", whenever used in the present specification and in the appended claims, means any structural, stiff, circular or polygonal element to be used in sectors such as transports, household electrical apparatus and appliances, building, autos, telecommunications, office machines, etc., as doors, covers, casings, in particular for refrigerators or freezers, panels, containers, for example for portable thermal bags and the like.

At present, the articles of the above-cited type are generally obtained starting from two half-shells, which are mechanically assembled by welding or glueing, whereafter the hollow part present between the two half-shells is filled with foamed polyurethane.

Another technique, described in Italian patent application 21815 A/87, comprises the steps of producing by blow-molding a hollow casing made of a thermoplastic polymer and then filling the casing with a foamable polyurethane mixture.

The foamed polyurethane, used as a thermoinsulating material in both the above-illustrated techniques, is prepared starting from a formulation, which consists of an organic diisocyanate, a polyol, a silicone surfactant, a polymerization catalyst and a foaming agent of chlorofluoroalkane nature, such as Freon.

At present, the choice of foamed polyurethane as a thermoinsulating material gives rise to problems of ecological nature as the foaming agents based on chlorofluoroalkanes such as Freon are supposed to be one of the main causes which lead to the alteration and destruction of the ozone layer which is present in the stratosphere.

However, replacing polyurethane with an equivalent material is a problem not easily solved since this polymer, owing to the fact that it is foamed in situ according to the well known R.I.M. technique (Reaction Injection Molding), enables one to obtain self-supporting stiff structural elements even if the outer casing is made of a thermoplastic polymer instead of a metallic sheet.

That is due to the fact that polyurethane, as it reacts in situ, perfectly adheres to the inner walls of the casing, thereby forming with it a structural integral body.

The Applicant has now found a process, which enables one to obtain thermoinsulating, optionally structural elements by using foamed thermoplastic materials, which do not necessarily require the use of chlorofluorocarbons as foaming agents and which guarantee, as compared with the products of the art, at least equal insulating characteristics, the thickness being equal.

SUMMARY OF THE INVENTION

The present invention provides a process for preparing thermoinsulating and structural formed articles which comprises the following steps:

(a) heating a thermoplastic polymer sheet at a temperature above its softening point;

(b) thermoforming the heated thermoplastic polymer sheet on a thermoinsulating foamed preform made of substantially the same polymeric material; and wherein (c) prior to the thermoforming in step (b), the thermoinsulating foamed preform is cooled to prevent excessive collapse of the surface of the thermoinsulating foamed preform resulting from contact with the heated sheet.

DETAILED DESCRIPTION OF THE INVENTION

The thermoinsulating preform is preferably made, according to the present invention, of a foamed polymeric material. Any foamed polymer can be used for producing the thermoinsulating preform utilized in the present process, although foamed polystyrene and foamed impact-resistant polystyrene or foamed polypropylene and foamed impact-resistant polypropylene are preferred.

Also as regards the plate or sheet to be thermoformed on the preform there are no particular requirements, except that of being prepared from thermoplastic polymers.

Examples of such polymers are: polystyrene, impact-resistant polystyrene, polystyrene modified with polar monomers such as acrylonitrile, styrene mixtures such as ABS, SAN, etc., polyvinyl chloride, high, mean and low density polyethylene, polypropylene, impact-resistant polypropylene, ethylene/propylene copolymers, acrylic and/or methacrylic resins, polymethacrylates, polyester resins such as PET, PBT, etc.

Preferred products are polystyrene, impact-resistant polystyrene, styrene mixtures, polypropylene and impact-resistant polypropylene. Although the thermoplastic polymer sheet may be made from polymers which are different from the thermoinsulating foamed preform, it is preferred that they are made of substantially the same polymeric material to facilitate recycling of the formed articles. As used herein the term "substantially the same polymeric material" means materials which belong to the same family of polymers and which are chemically compatible, i.e., they can be heat-welded or can be easily recycled if mixed together, notwithstanding the fact that the materials may differ in physical features such as melt index, impact strength, tensile and flexural properties. For example, the term "substantially the same polymeric material" when used in reference to a polystyrene material would encompass all of the various grades of polystyrene. Similarly, the term "substantially the same polymeric material" when used in reference to a polypropylene material would encompass all of the various grades of polypropylene.

The plate or sheet to be thermoformed, having an average thickness ranging from 0.5 to 20 mm, is brought to a temperature, generally higher than 100° C., preferably ranging from 120° to 200° C. as a function of the utilized polymer, by means of known techniques, for example by infrared radiation or by using electrically heated plates.

Cooling the thermoinsulating foamed preform prior to bringing it in contact with the heated thermoplastic sheet is necessary to prevent the surface of the thermoinsulating foamed preform from collapsing and reducing the thickness of the thermoinsulating foamed preform. Moreover, cooling the thermoinsulating foamed preform ensures that there will be good adhesion between the thermoplastic sheet and the thermoinsulating foamed preform.

In applications involving foamed polystyrene preforms and 1 mm sheets of polystyrene, which sheets typically have softening temperatures of about 75° to about 95° C., it is necessary to cool the preform to ensure that the interface temperature between the sheet and the preform during the thermoforming step is between about 115° to about 120° C. Such interface temperatures can be achieved, for example, by placing the preform in a freezing cell at −20° C. for two hours.

In applications involving foamed polypropylene preforms and 1 mm sheets of polypropylene, which sheets typically have softening temperatures of about 105° to about 110° C., the preform should be cooled so that the interface temperature between the sheet and the preform during the thermoforming step is between about 150° to about 155° C. Such interface temperatures can be achieved, for example, by placing the preform in a freezing cell at −5° C. for two hours.

The thermoforming of the plate or sheet on the thermoinsulating preform can be carried out according to various methods. For example, vacuum can be generated in the mold, if the mold has a concavity, or a counter-mold can be used, which helps in counterforming the plate or sheet on the preform. It is preferred to thermoform the sheet to the preform by forming a plurality of holes of approximately 1 mm in diameter on the surface of the preform, and creating a vacuum through such holes to evacuate air between the preform and the sheet.

A practical embodiment of the process of the invention, to be considered as an example but not as a limitation thereof, is illustrated in the attached drawing, in which:

FIG. 1 is a sectional view of the scheme for preparing a thermoinsulating formed body starting from a concave preform and FIG. 2 is a sectional view of the scheme for preparing a thermoinsulating body starting from a convex preform.

The operation of the process object of the present invention is apparent from the drawing and the preceding description. A preform (4) is laid onto a forming mold (1) fixed to a mold-holding plate (2), which is supported on a bedplate (3). A thermoplastic plate (6), heated up by means of heaters (5), is conformed by means of thermoforming to the preform or by vacuum generation, by means which are not illustrated in FIG. 1, or by the aid of a countermold not shown in FIG. 2.

Since the plate is at a thermoplastic processing temperature, during the forming it perfectly adheres to the preform (4) and welds on it to form a thermoinsulating, optionally structural formed body or article (10).

In the practical embodiment of the present invention, various changes, modifications and variations can be brought to the various parts which form the scheme for producing thermoinsulating and/or structural formed articles, which is illustrated, as an example, in the figures of the attached drawing, without departing, however, from the gist and the scope of the present invention.

The following Examples further illustrate the present invention, although various changes and modifications may be made without departing from the gist and scope of the present invention.

EXAMPLE 1

A polystyrenic thermoplastic sheet, obtained by extrusion, with a thickness of 1 mm (dimensions: 600×500 mm) was placed on a clamping frame of a TRIULZI thermoforming machine having a working plane of 2000×1000 mm. The material used for the sheet was "EDISTIR SRL 600", produced by ENICHEM POLIMERI. The "EDISTIR SRL 600" polystyrene had the following properties: a melt flow index of 4 g/10 min. (ASTM method D 1238 measured at 200° C. under a load of 5 kg); a specific gravity of 1.04 g/cm$^3$ (ASTM method D 792); a flexural modulus of 1850 N/mm$^2$ (ASTM method D 790); a tensile strength of 17 N/mm$^2$ (ASTM method D 638); an Izod impact strength (notched) of 85 J/m (ASTM method D 256); and a heat distortion temperature of 90° C. (ASTM method D 648 at a load of 1.82 N/mm$^2$).

A mold was placed on the lower plane of the thermoforming machine, the mold having the box-like shape of the kind shown in FIG. 1.

The dimensions of the mold were: width 380 mm; length 450 mm; depth 120 mm.

A foamed polystyrenic preform was obtained as follows: A mold was filled with "EXTIR A 3000" polystyrene expandable beads manufactured by ENICHEM POLIMERI. The beads were heated and sintered together to form a foamed polystyrenic preform having 1 mm holes across its surface in accordance with the process described in published Japanese patent application No. 58-22142, which is incorporated herein by reference. The thickness of the foamed preform was 18 mm and its density 35 kg/m$^3$. The foamed polystyrenic preform was placed in a freezing cell at −20° C. for two hours, at which time the surface temperature of the preform was determined to be −20° C.

The cooled preform was placed into the thermoforming mold. The polystyrenic sheet, after positioning in the clamping frame, was heated by two infrared radiating ceramic panels placed at a distance of 200 mm from the sheet and having a power of 1.4 watt/cm$^2$. The heating time was 20 seconds and the surface temperature of the sheet reached 170° C.

The mold had 1 mm holes along its walls. During the thermoforming of the heated sheet to the cooled preform, a vacuum was created through the holes in the walls of the mold and the holes in the preform. The vacuum evacuated air between the preform and the sheet, causing the sheet to be brought into contact with the preform and strongly adhered thereto.

The thermal treatment of the preform in the freezing cell is necessary in order to avoid the collapse of the surface portion of the foamed preform which comes into contact with the hot sheet during the thermoforming process. It was observed that in order to obtain a good adhesion between the thermoformed sheet and the foamed preform, it is necessary to obtain an interface temperature between 115° and 120° C. Higher temperatures are unsatisfactory due to an excessive collapse of the foamed structure which comes into direct contact with the hot sheet.

The pretreatment of the preform in the freezing cell at −20° C. caused an interface temperature between 115° and 120° C. which resulted in good adhesion between the preform and the thermoformed sheet and limited the amount of shrinkage of the preform to superficial levels (a reduction of less than about 0.5 to 1 mm in the thickness of the preform).

The article obtained by the foregoing process is a thermoinsulating structural body comprising a rigid foamed polystyrenic layer having a density of 35 kg/m$^3$, coupled with a compact polystyrenic layer having a thickness varying between 0.5 mm in the zones having high bend radius and 0.8 mm in the central level surface.

EXAMPLE 2

A polypropylenic thermoplastic sheet, obtained by extrusion, with a thickness of 1 mm (dimensions: 600×500 mm) was placed on the clamping frame of the same thermoforming machine of Example 1.

The polypropylene used for obtaining the thermoplastic sheet was "MOPLEN EPQ30RF" produced by HIMONT. The "MOPLEN EPQ30RF" polypropylene had the following properties: a melt flow index of 4 g/10 min. (ASTM method D 1238 measured at 230° C. under a load of 2.16 kg); a specific gravity of 0.9 g/cm$^3$ (ASTM method D 792); a flexural modulus of 1650 N/mm$^2$ (ASTM method D 790); a tensile strength of 36 N/mm$^2$ (ASTM method D 638); an Izod impact strength (notched) of 350 J/m (ASTM method D 256); and a heat distortion temperature of 121° C. (ASTM method D 648 at a load of 0.46 N/mm$^2$).

A foamed polypropylenic preform (same material as the sheet) obtained by the bead sintering technology described in Example 1, and having 1 mm holes across its surface, was placed in a freezing cell at −5° C. for two hours, at which time the surface temperature of the preform was determined to be −5° C. The thickness of the preform was 18 mm and the density 35 Kg/m$^3$. The preform was placed into the same thermoforming mold used in Example 1.

The sheet of polypropylene was heated with the same radiating panels of Example 1 for 30 seconds, resulting in a sheet temperature of 175° C.

The subsequent thermoforming of the sheet on the cooled foamed preform was made according to the same procedure of Example 1. The cooling of the preform caused an interface temperature during thermoforming of 150°–155° C., resulting in good adhesion between the preform and the thermoformed sheet and limited the amount of shrinkage of the preform to superficial levels (a reduction of less than about 0.5 to 1 mm in the thickness of the preform).

The obtained article is a thermoinsulating structural body comprising a rigid foamed polypropylenic layer having a density of 35 Kg/m$^3$ and a compact polypropylene layer having a thickness variable between 0.5 and 0.8 mm.

We claim:

1. A process for preparing thermoinsulating and structural formed articles which comprises the following steps:
   (a) heating a thermoplastic polymer sheet at a temperature above its softening point;
   (b) thermoforming the heated thermoplastic polymer sheet on a thermoinsulating foamed preform made of substantially the same polymeric material; and
   (c) prior to the thermoforming in step (b), cooling the surface of the thermoinsulating foamed preform which is to be brought into contact with the heated thermoplastic polymer during step (b) to a temperature which is selected so that the heated thermoplastic polymer sheet and the surface of the thermoinsulating foamed preform will reach an interface temperature during thermoforming that limits surface collapse of the thermoinsulating foamed preform to no more than about 1 mm in thickness.

2. The process according to claim 1, wherein the thermoplastic polymer sheet and the thermoinsulating foamed preform comprise polystyrene and the interface temperature is about 115° to 120° C.

3. The process of claim 2, wherein the thermoinsulating foamed preform has a plurality of 1 mm holes, and the thermoforming step (b) comprises the following steps:
   (i) placing the cooled thermoinsulating foamed preform having a plurality of 1 mm holes onto a thermoforming mold, wherein the mold has a plurality of 1 mm holes; and
   (ii) creating a vacuum through the 1 mm holes in the mold and the 1 mm holes in the cooled thermoinsulating foamed preform to evacuate air between the cooled thermoinsulating foamed preform and the heated thermoplastic polymer sheet and to bring the heated thermoplastic polymer sheet into contact with the cooled thermoinsulating foamed preform.

4. The process of claim 1, wherein the thermoplastic polymer sheet and the thermoinsulating foamed preform comprise polypropylene and the interface temperature is about 150° to 155° C.

5. The process of claim 4, wherein the thermoinsulating foamed preform has a plurality of 1 mm holes, and the thermoforming step (b) comprises the following steps:
   (i) placing the cooled thermoinsulating foamed preform having a plurality of 1 mm holes onto a thermoforming mold, wherein the mold has a plurality of 1 mm holes; and
   (ii) creating a vacuum through the 1 mm holes in the mold and the 1 mm holes in the cooled thermoinsulating foamed preform to evacuate air between the cooled thermoinsulating foamed preform and the heated thermoplastic polymer sheet into contact with the cooled thermoinsulating foamed preform.

6. The process of claim 1, wherein the surface collapse of the thermoinsulating foamed preform is limited to no more than about 0.5 mm in thickness.

* * * * *